Patented Apr. 23, 1929.

1,709,956

UNITED STATES PATENT OFFICE.

HEINZ SCHEYER, OF FRANKFORT-ON-THE-MAIN, GERMANY, ASSIGNOR TO GRASSELLI DYESTUFF CORPORATION, OF NEW YORK, N. Y., A CORPORATION OF DELAWARE.

VAT DYESTUFFS OF THE ANTHRACENE SERIES AND PROCESS OF MAKING SAME.

No Drawing. Application filed September 26, 1927, Serial No. 222,208, and in Germany September 30, 1926.

My invention relates to new valuable vat dyestuffs of the anthracene series, which are obtainable by treating with alkaline condensing agents a glyoxal-dianthraquinone compound of the general formula:

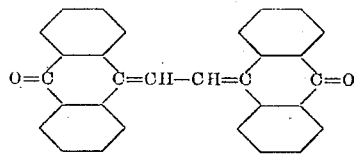

in which the anthraquinone nuclei may be substituted by monovalent substituents such as halogen, alkyl- or aryl-groups. The starting materials may be obtained according to the process described in U. S. Patent 1,646,782.

As alkaline condensing agents particularly caustic alkalies with the addition of an alcohol may be used, or for instance sodium ethylate or other similar acting agents.

The course of reaction is unknown. Regarding the properties of the new condensation products, one may assume that an intramolecular condensation, and formation of a new ring system, take place.

The new vat dyestuff obtainable according to my invention are when dry intense red to violet powders, difficultly soluble in organic solvents, soluble in concentrated sulfuric acid with an intense greenish color and form with an alkaline hydro-sulfite solution red to violet vats, from which cotton is dyed red to violet shades of an excellent fastness.

In order to further illustrate my invention the following examples are given, the parts being by weight and all temperatures in centigrate degrees, but is is understood, that my invention is not limited to the particular products or reacting conditions mentioned therein.

Example 1.

At about 120° 2 parts of the condensation product derived from anthrone and glyoxal of the formula:

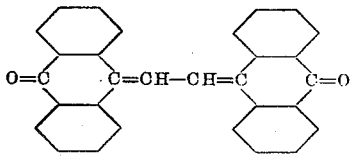

(cf. Example 1 of the aforesaid U. S. A. patent) are introduced while stirring into a molten mixture of 8 parts of caustic potash and 8 parts of ethylic alcohol. After stirring the mass for some hours at about 120–140° it is poured on water and the dyestuff obtained is isolated in the usual manner, for instance by introducing a current of air. When recrystallized from nitrobenzene the new dyestuff is obtained as violet needles of a metallic greenish lustre, soluble in concentrated sulfuric acid with a yellowish green color. It forms with an alkaline hydrosulfite solution a cherry red colored vat and dyes cotton therefrom fast claret red shades.

When replacing in this example the anthroneglyoxal-condensation product by the equivalent amount of the corresponding condensation product derived from 2-phenyl-anthrone and glyoxal (red powder soluble in concentrated sulfuric acid with a blue color) in an analogues manner a dyestuff is obtained dyeing cotton from a reddish violet colored vat violet shades of a great fastness.

Example 2.

2 parts of the condensation product, obtainable by condensing 2-chloroanthrone with glyoxalsurfate according to the process of the aforesaid U. S. A. patent, being orange red needles, soluble in concentrated sulfuric acid with a greenish blue color and corresponding most probably to the formula:

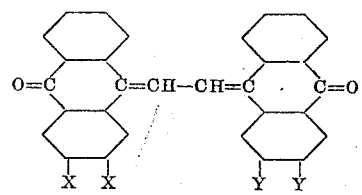

in which one X and one Y stand for chlorine atoms and the other X and the other Y stand for hydrogen, are boiled for some hours under reflux with a mixture of 32 parts of ethylic alcohol and 4 parts of caustic potash, until the starting material has disappeared. The new dyestuff thus obtained is isolated in the usual manner, it may be purified by extracting it with hot nitrobenzene. It represents a violet powder of a metallic greenish lustre, soluble in concentrated sulfuric acid with a yellowish green color and dyes cotton claret red shades from a violet red vat.

With the same result the caustic potash may be replaced by the corresponding quantity of caustic soda or by employing sodium ethylate.

*Example 3.*

2 parts of the condensation product derived from 1-chloro-anthrone and glyoxal (cf. Example 2 of the aforesaid U. S. A. patent) are treated for about two hours at abut 120–140° with a mixture of 8 parts of caustic potash and 8 parts of ethyl-alcohol. The new dyestuff thus obtained is isolated as described in the foregoing examples. It is soluble in concentrated sulfuric acid with a bluish green color and dyes cotton from a bluish red vat somewhat more bluish shades than the dyestuff described in Example 1. The ethylalcohol may be replaced by the same quantity of methyl- or butyl-alcohol.

I claim:

1. The process for producing new vat dyestuffs of the anthracene series which comprises treating with an alkaline condensing agent a glyoxal-dianthraquinone compound of the general formula:

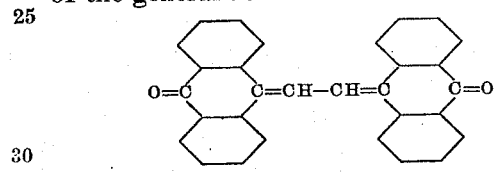

in which the anthraquinone nuclei may be substituted by a monovalent substituent.

2. The process for producing new vat dyestuffs of the anthracene series which comprises treating with a caustic alkali and with the addition of an aliphatic alcohol a glyoxal-dianthraquinone compounds of the general formula:

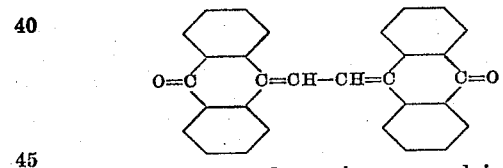

in which the anthraquinone nuclei may be substituted by a monovalent substituent.

3. As new products vat dyestuffs of the anthracene series being when dry intense red to violet powders, soluble in concentrated sulfuric acid with an intense greenish color, forming with an alkaline hydrosulfite solution red to violet vats, dyeing cotton therefrom red to violet shades of an excellent fastness, which dyestuffs are substantially identical with products obtainable by treating with an alkaline condensing agent a glyoxaldianthraquinone compound of the general formula:

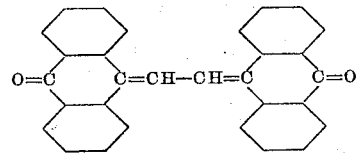

in which the anthraquinone nuclei may be substituted by monovalent substituent.

4. As a new product the vat dyestuff, being when dry a violet powder of a metallic greenish lustre, soluble in concentrated sulfuric acid with an intense greenish color, forming with an alkaline hydrosulfite solution a violet-red vat and dyeing cotton therefrom claret red shades of an excellent fastness which dyestuff is substantially identical with the product obtainable by treating with an alkaline condensing agent the glyoxal-dianthraquinone compound of the formula:

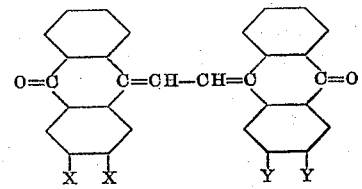

in which one X and one Y stand for chlorine atoms and the other X and the other Y stand for hydrogen.

5. The process which comprises boiling under reflux about 2 parts of the compound having most probably the formula:

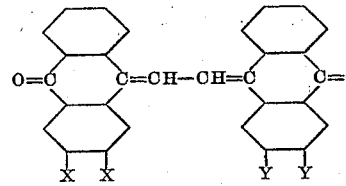

in which one X and one Y stand for chlorine atoms and the other X and the other Y stand for hydrogen with about 32 parts of ethyl alcohol and about 4 parts of caustic potash until the starting material has disappeared, and isolating the reaction product.

In testimony whereof, I affix my signature.

HEINZ SCHEYER.